(12) United States Patent
Gunter (10) Patent No.: US 6,387,002 B1
(45) Date of Patent: May 14, 2002

(54) ENERGY FEED CHAIN (75) Inventor: Blase Gunter, Bergisch Gladbach (DE)

(73) Assignee: Igus Spritzgubteile fur die Industrie GmbH, Cologne (DE)

( * ) Notice: Subject to any disclaimer, the term of this patent is extended or adjusted under 35 U.S.C. 154(b) by 0 days.

(21) Appl. No.: 09/355,001

(22) PCT Filed: Jan. 9, 1998

(86) PCT No.: PCT/DE98/00092

§ 371 Date: Sep. 20, 1999

§ 102(e) Date: Sep. 20, 1999

(87) PCT Pub. No.: WO98/31950

PCT Pub. Date: Jul. 23, 1998

(30) Foreign Application Priority Data

Jan. 21, 1997 (DE) .......................... 197 01 706

(51) Int. Cl.[7] .................. F16G 13/02; F16G 13/00
(52) U.S. Cl. ................. 474/206; 474/207; 59/78.1; 59/900
(58) Field of Search .............. 474/206, 207, 474/208, 209, 212, 213; 59/78.1, 78, 84, 900; 248/48, 49

(56) References Cited

U.S. PATENT DOCUMENTS 3,448,954 A  *  6/1969  Kurlandsky ............. 474/206 X
4,626,233 A  * 12/1986  Moritz ...................... 474/206
5,157,913 A  * 10/1992  Wehler et al. ........... 59/900 X
RE35,579 E  *  8/1997  Moritz et al. ............. 59/78.1
5,724,803 A  *  3/1998  Pea ............................ 59/78.1
5,810,688 A  *  9/1998  Hama ........................ 474/207
5,836,148 A  * 11/1998  Fukao ....................... 59/78.1
6,107,565 A  *  8/2000  O'Rourke ............. 59/78.1 X

FOREIGN PATENT DOCUMENTS

| DE | 1 193 900 | 6/1965 |
| DE | 3531066 | 12/1987 |
| DE | 395 12 196 | 10/1995 |
| EP | 0 277 389 | 12/1987 |
| GB | 2 111 634 | 7/1983 |

* cited by examiner

Primary Examiner—Thomas R. Hannon
Assistant Examiner—Marcus Charles
(74) Attorney, Agent, or Firm—Reising, Ethington, Barnes, Kisselle, Learman & McCulloch, P.C.

(57) ABSTRACT

An energy guiding chain is provided for guiding cables and hoses from a fixed location to a movable connection point. It is made of a plurality of chain straps (1a,1b) in a single strand. Each strap has a pair of joint sections with one joint section of each strap overlapping a joint section of an adjacent strap and being connected thereto by a pivot joint. Adjacent strap can be angled relative to one another with the joint axes (3a) of at least some chain straps (1a) intersecting each other and some chain straps (1b) having parallel joint axes (3b). Some of the chain straps (1a,1b) are provided with support frames for accommodating the cables and hoses.

34 Claims, 5 Drawing Sheets

ENERGY FEED CHAIN

CROSS-REFERENCES TO RELATED APPLICATIONS

Not Applicable.

STATEMENT REGARDING FEDERALLY SPONSORED RESEARCH OR DEVELOPMENT

Not Applicable

BACKGROUND OF THE INVENTION

The invention relates to an energy guiding chain for guiding for guiding cables, hoses a the like from a fixed to a movable connection point on a curved path, with chain straps which are connected to one another in articulated fashion and can be angled relative to one another, where the joint axes of at least some chain intersect.

An energy guiding chain of this type is known from EP 0 277 389, for example. This chain is formed by chain links connected to one another in articulated fashion in the known manner, where each of the chain links is formed by two chain straps arranged roughly parallel to one another, which are connected to one another by way of a lower base plate integrally molded as one piece and an upper detachable or removable cross-member. Each chain link is connected to the adjacent chain link by way of two tab-like strap projections, which snap into corresponding slit-shaped holes in the adjacent chain scraps and are connected to them in articulated fashion via pins running through the holes and the strap projections. In order to ensure the back-and-forth rolling motion of the energy guiding chain on a curved—for example helical—path, and in order to produce a curve in the chain, the inner straps of the chain facing the center point of the curve are shorter than the outer straps of the chain. In addition, the base plate connecting the chain straps is of trapezoidal shape. The joint axes of each chain link are at angle to one another, where the point of intersection of the axes defines the centre point of the chain curve.

Thus, the known chain can follow the path of a curve in its back-and-forth rolling motion, even if the path is inclined. This offers the advantage that, for example, rotating energy consumers, such as assembly robots and the like, can be connected by way of this kind of energy guiding chain to energy supply lines installed in a protected and strain-relieved manner.

However, the energy guiding chain disclosed in EP 0 277 389 has the disadvantage that, due to the different lengths of the straps and due to the angled position of the joint axes relative to one another, the fit between the joint connections must be very loose in order to guarantee smooth running, i.e. smooth back-and-forth rolling motion, of the chain. The known chain must be manufactured with very large tolerances. The pins and bore holes must engage with a great deal of play, because the chain must move not only in a circle, but also vertically at the same time. Due to this bending in two planes, the chain strand must be able to twist to a certain degree. In turn, the great amount of play in the joint connections makes specially designed guide elements and guide channels indispensable for lateral stabilisation of the chain. The known energy guiding chain also has the disadvantage that chain links of various shapes and sizes must be available in order to produce different radii of curvature and various interior spaces for the energy lines.

BRIEF SUMMARY OF THE INVENTION

The invention is thus based on the task of improving an energy guiding chain of the type described above in such a way that it can be manufactured with joint connections of tight tolerance, while retaining good sliding and rolling properties. In particular, the chain according to the invention should be easy to assemble and ensure optimum adaptation to the movement cycle of the machine to be equipped and to the desired interior space using simple means.

The task is solved by an energy guiding chain which is characterized by the fact that the chain is formed by only one strap strand and that at least some of the chain straps are provided with at leas one support frame for accommodating the cables, hoses and the like.

A chain of this kind formed by only one strap strand has various advantages over the known chain. It is considerably easier to assemble, the joint connections can be designed with virtually no play and, above all, the width of the usable space available for accommodating cables, hoses and the like can be varied. This is especially possible through the use of the support frames provided on the chain straps for accommodating the cables.

Experiments with the energy guiding chain according to EP 0 277 389 showed that virtually the entire load of the chain strand is borne by the outer strap strand. The invention takes advantage of this by completely dispensing with one chain strand, so that, in addition to a substantial reduction in weight, the fits of the single-strand chain can be designed to be very tight, this simultaneously improving the lateral stability of the chain, as well as its flexibility and twistability. The support frames can be mounted on the inside and also the outside of the curve in the chain.

In a preferred version of the invention, the support frame is formed by upper and lower cross-members which can be attached to the chain straps in a detachable manner and which are assembled to form a closed frame by way of a detachable connecting member. Cross-members of standard, i.e. conventional, chain links can be used for this purpose.

The support frame can alternatively consist of a u-shaped bracket or the like designed as a single piece, which can be mounted on the chain straps in a detachable manner. The width and usable space of the chain can be varied by using support frames or support brackets which can be counted on the chain straps in a detachable manner.

In a particularly preferred practical example, chain straps with parallel joint axes and chain straps with intersecting joint axes are alternately connected to one another to form a chain strand, In this context, the intersecting joint axes do not all intersect at one point, but rather run along an arc. The centre point of this arc defines the centre point of the circular motion. The alternating arrangement of chain straps with intersecting joint axes and parallel joint axes has the advantage that only one chain link need be replaced at any one time in order to change the diameter of the circle.

The joint sections of chain straps with intersecting point axes are expediently formed by strap sections angled towards one another.

For example, adjacent chain straps connected to one another can overlap and display a positive fit by way of holes and pins.

It has proven to be particularly expedient for the same side of a chain strap to be positioned on top of the two directly adjacent chain straps, where one chain strap is provided with holes and the directly adjacent chain strap with protruding pains which snap into the holes of the adjacent chain strap.

In order to be able to hold the chain strand together in a secure fashion, the ends of the upper and lower cross-members on one outer strap, or the ends of the legs of the U-shaped bracket, which respectively form the support frame, are dimensioned such that they cover the overlap area with the adjacent chain straps and act as a stop to prevent separation of the chain straps transverse to the direction of motion. This type of cross-member design is known but proves to be particularly expedient for the energy guiding chain according to the invention. Each of the chain straps is expediently provided with projections designed as snap ridges, which interact in a known manner with corresponding recesses in the upper and lower cross-members or in the legs of the bracket.

As additional protection against separation of the chain straps transverse to the direction of motion, the straps provided with pins each have a shoulder around a partial length of their outer edges, which is engaged by locking projections of the straps provided with holes.

In a particularly preferred configuration of the invention, the connecting member is provided with projections designed as snap ridges, which interact with recesses in the upper and lower cross-members. In this way, the support frame for accommodating the cables can be assembled using cross-members for conventional energy guiding chains.

Instead of a support frame, at least some of the chain straps can be provided with support loops for accommodating the cables. This would further reduce the weight and dimensions of the chain according to the invention, which has a positive effect on the running properties of the chain.

To provide additional guidance, at least some of the chain straps can be equipped with guide projections on at least one of their narrow sides, which interact with a groove provided in a guide rail or the like. Guide projections of this kind, which engage the guide groove provided for this purpose with play, can be particularly expedient in the case of large chain radii. The guide projections and the guide groove prevent excessive loading of the chain transverse or tangential to its direction of motion.

BRIEF DESCRIPTION OF THE SEVERAL VIEWS OF THE DRAWINGS

The invention is described below based on a practical example illustrated in the drawings.

The drawings show the following.

DETAILED DESCRIPTION OF THE INVENTION

Figures 1A, 1B:
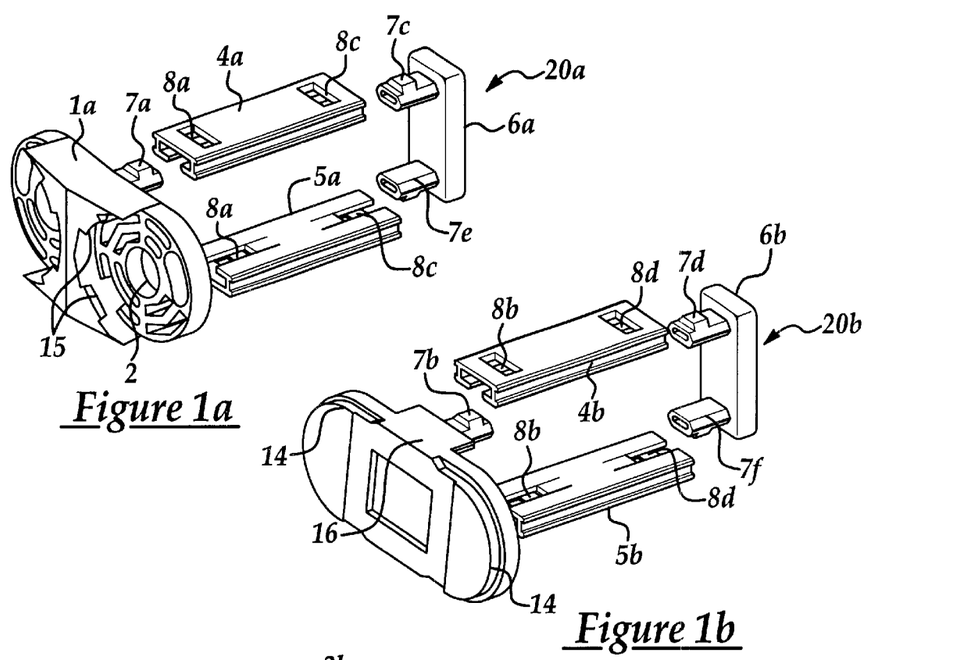
FIG. 1a an exploded view of an inner chain scrap.
FIG. 1b an exploded view of an outer chain strap which is adjacent and linked to the inner chain strap of FIG. 1a, FIG. 2 a top view of a section of an energy guiding chain according to the invention, FIG. 3 an enlarged top view of a section of the energy guiding chain shown in FIG. 2, partially cut away, FIG. 4 a schematic view of a consumer mounted in rotating fashion, with a chain connection point located on the consumer which can rotate with the consumer, and with an energy guiding chain attached at the chain connection point which can be rolled back and forth on a fixed guide channel, FIG. 5 a section along line C–D in FIG. 4, FIG. 6 view A indicated in FIG. 4, FIG. 7 the arrangement from FIG. 4, where the movable connection point has been rotated by 180° in the direction of the arrow show in FIG. 4.
Figure 2:
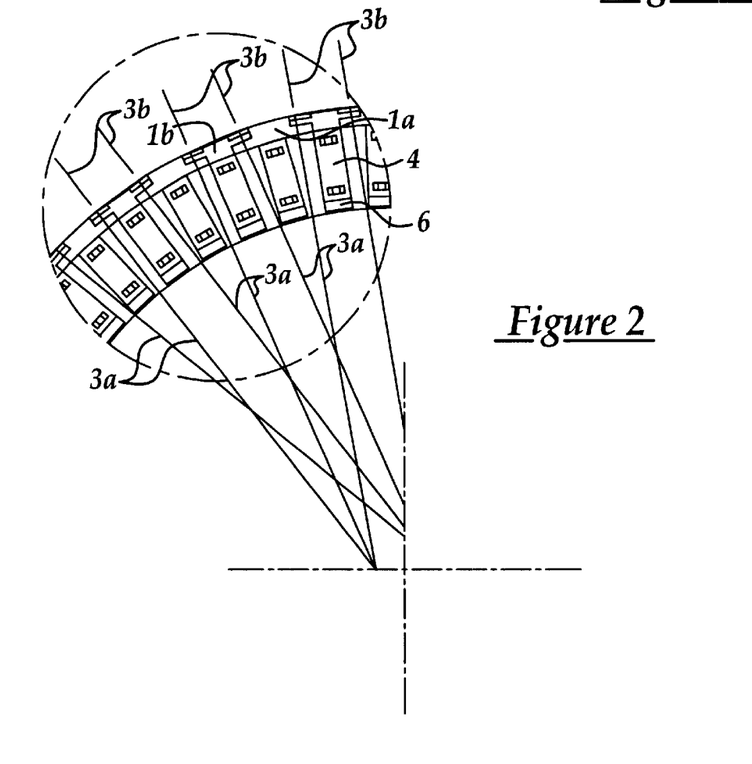
Figure 10:
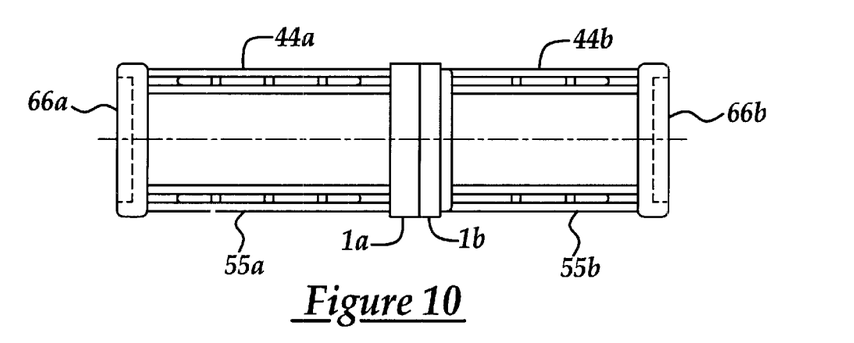
FIG. 10 the view of a chain strap provided with a support frame on both sides.

FIG. 1 shows two adjacent chain straps 1a and 1b of a strap strand of the energy guiding chain according to the invention. For the sake of simplicity, one of the chain straps will be designated below as inner strap 1a, and the other as outer strap 1b, where these items are based on the position of the interior space for the cables or hoses formed by the energy guiding chain selected in the practical example and apply only to the practical example described. It is evident to a person skilled in the art that an interior space for energy lines can be provided on both sides of each chain strap, as illustrated in FIG. 10, in which case the terms outer strap, on the one hand, and inner strap, on the other, no longer apply. In this case, the chain strap provided with holes 2 is designated as inner strap 1a, while the chain strap provided with pins is designated as outer strap 1b.

As is clearly evident in the drawings, the energy guiding chain according to the invention is formed by a strap strand consisting of inner straps 1a and outer straps 1b, where pins 19 on outer straps 1b (see FIG. 11 ) engage holes 2 on inner straps 1a, so that chain straps 1a and 1b form a strand which can be angled in at least one direction, where directly adjacent chain straps connected to one another overlap. In this context, the same side of inner strap 1a is positioned on top of adjacent outer straps 1b. The joint sections of inner strap 1a are angled towards one another in such a way that their joint axes 3a intersect a common point. In contrast, joint axes 3b of outer straps 1b run parallel to one another, so that chain scraps 1b with parallel point axes 3b and chain straps 1a with intersecting joint axes 3a are connected to one another in alternating fashion. The energy guiding chain is thus curved, the intersecting joint axes 3a being situated on an arc.

In the practical example shown in FIGS. 1a and 1b, support frames 20a and 20b for accommodating cables or hoses are formed, respectively, on one side of the inner strap 1a and outer strap 1b of the strap strand. The support the 20a comprises upper cross-member 4a, lower cross-member 5a and connecting member 6a. Similarly, the support frame 20b comprises upper cross-refer 4b, lower cross-member 5b and connecting member 6b. Chain straps 1a and 1b are each provided with known upper projections 7a and 7b, respectively, designed as snap ridges. The chain straps 1a and 1b also have known lower projections (not shown) of the same structure as the upper projections 7a and 7b. The projections 7a and 7b interact with recesses 8a and 8b, respectively, in the upper an laser cross-member 4a and 4b. The lower cross-member 5a and 5b have recesses 8a and 8b, respectively, which interact with the above-mentioned lower projections on straps 1a and 1b. Each of the connecting members 6a and 6b is provided with upper projections 7c and 7d, respectively, which interact with recesses 8c and 8d, respectively, in the upper cross-member 4a and 4b. The lower cross-member 5a and 5b have recesses 8c and 8d, respectively, which interact with lower projections 7e and 7f, respectively, on the connecting members 6a and 6b. Upper and lower cross-member 4a, 5a and 4b, 5b are designed in the manner of conventional cross-members for conventional energy guiding chains and are assembled to form self-supporting support frames 20a and 20b on the sides of chain straps 1a and 1b by snapping onto upper projections 7a and 7b (and corresponding lower projections mentioned above) of chain straps 1a and 1b. If necessary, intermediate cross members extending longitudinally between, or perpendicular to, upper and lower cross-members 4a, 5a and 4b, 5b can be provided, which further partition the interior space for the cables or hoses.

Connecting members 6a, 6b and upper and lower cross-members 4a, 4b and 5a, 5b, of adjacent chain links are not connected to one another. As mentioned at the start, support frames or brackets designed as one piece U-shaped bracket X of FIG. 13 or loop Y of FIG. 14, which are provided with corresponding recesses in order to snap onto projections 7a, 7b of the chain straps, can also be used instead of modularly assembled support frames consisting of upper and lower cross-members and connecting members.

The joint section of inner straps 1a, which are provided with holes 2, can be designed with additional holes, which act with the stops provided on outer straps 1b as pivot limiters, on the one hand, and also serve to reduce the weight, on the other hand.

Figure 3:
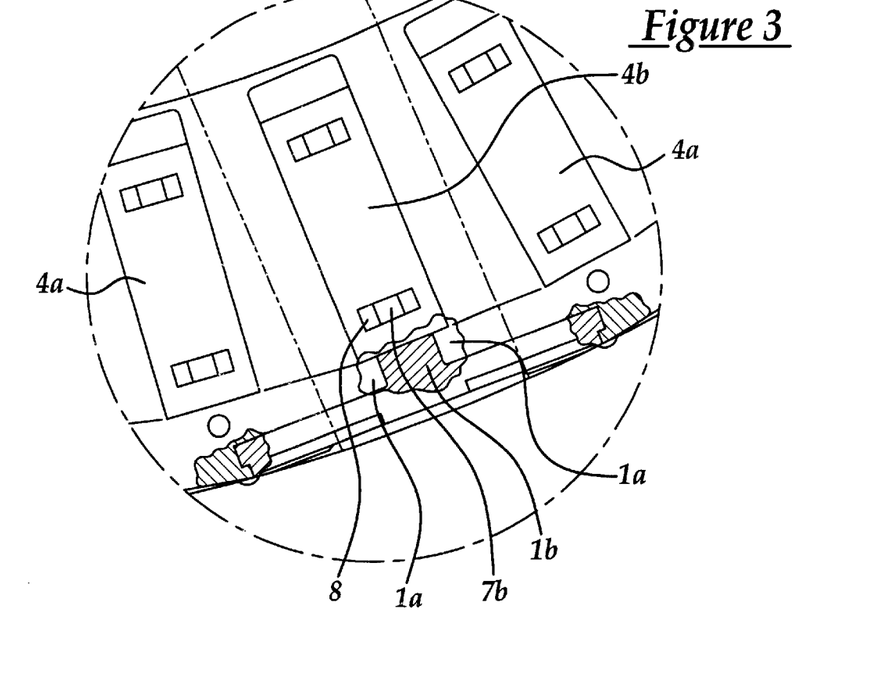

The widths of upper and lower cross-members 4a, 5a and 4b, 5b are dimensioned such that they—as shown in FIG. 3—each overlap the overlapping sections of two inner straps 1a with the associated outer strap, thus holding chain straps 1a and 1b together and acting as a stop to prevent the separation of chain straps 1a and 1b transverse to the direction of motion. As additional protection against separation of the strap strand, outer straps 1b are each provided with semi-circular shoulders 14 around the outer edge, which are overlapped by locking projections 15 of inner straps 1a.

However, connections can also be provided as alternative for attaching chain straps 1 to one another.

The overlapping of the overlapping section of two inner straps 1a with an outer strap 1b by an upper cross-member 4b is illustrated in FIG. 3 in a cut-away, hatched view.

Figure 4:
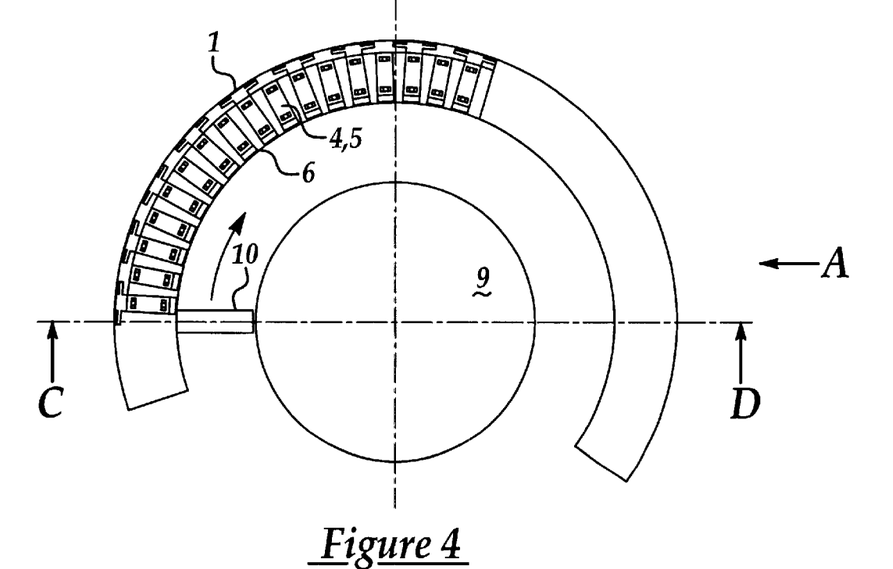
Figure 5:
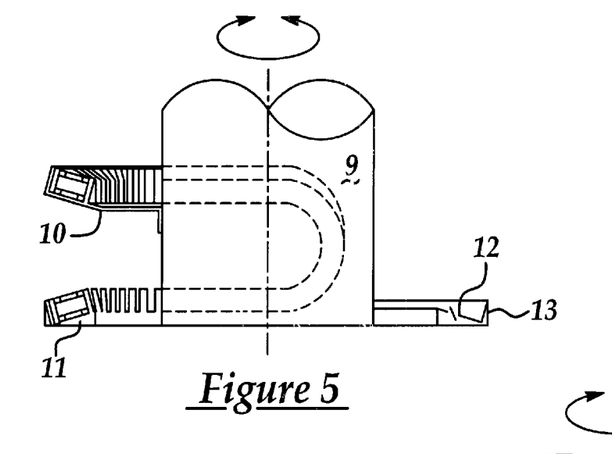
Figure 6:
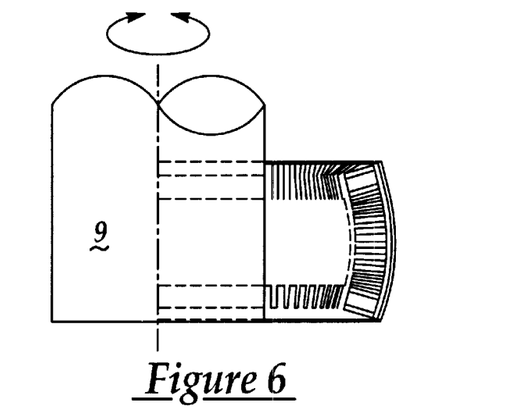

As shown by FIGS. 4 to 6, the energy guiding chain according to the invention can run from a connection point on a rotatable consumer to a fixed connection pint on a path that is curved in two planes. In FIGS. 4 to 6, the consumer is illustrated as a load-bearing column 9 which can rotate about its longitudinal axis. A connecting element 10, designed as an end attachment for the energy guiding chain, is connected to the column and thus also follows its rotating motion. The energy guiding chain runs from this connecting element 10 around load-bearing column 9 and downwards in an arc of 180°. The base of load-bearing column 9 is surrounded by an arc-shaped guide channel 11, on which the energy guiding chain can be rolled back and forth. In the practical example illustrated, guide channel 11 does not completely surround load-bearing column 9, but it can also be designed as a closed, i.e. complete, rings. Guide chapel 11 forms an outwardly slanting support surface 12 and a boundary wall 13 extending perpendicular to support surface 12.

Figure 7:
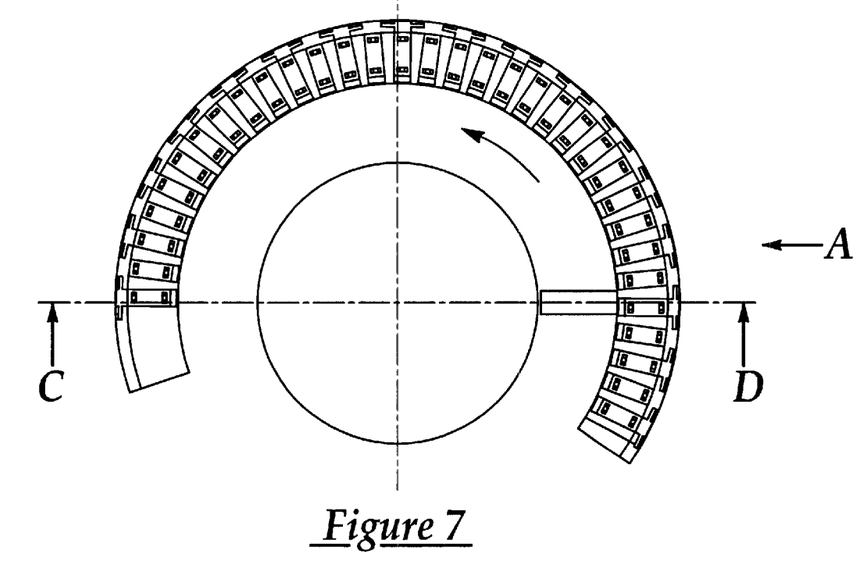
Figure 8:
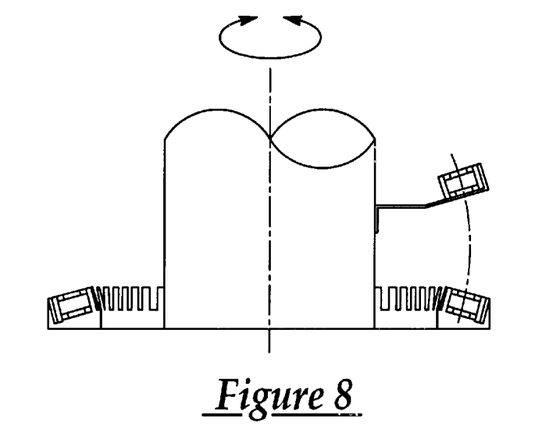
FIG. 8 a section alone line D—D in FIG. 7.
Figure 9:
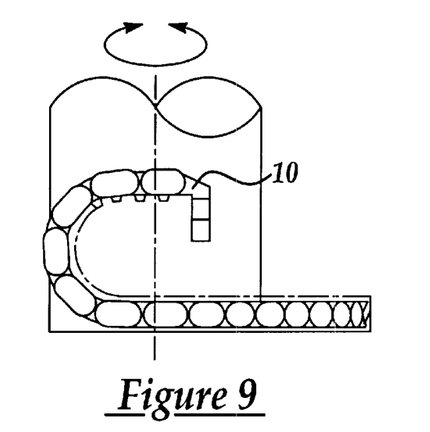
FIG. 9 view A indicated in FIG. 7.

FIGS. 7 to 9 illustrate the position of the energy guiding chain after load-bearing column 9 has rotated 180° in the direction of the arrow shown in FIG. 4. In this position, the energy guiding chain lies on guide channel 11 over the greater part of its length.

FIG. 10 shows a practical example of the invention, in which a first support frames is formed on one side of the chain straps 1a and 1b by upper and lower cross-members 44a and 55a and by connecting member 66a and a second support frame is formed on the other side of the chain straps 1a and 1b by upper and lower cross-members 44b and 55b and by connecting member 66b.

Figure 11:
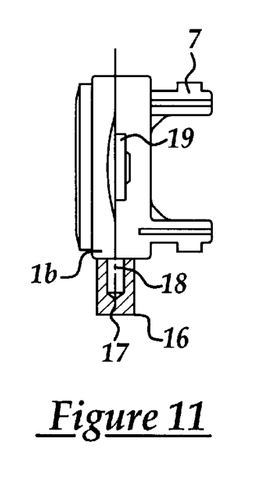
FIG. 11 a chain strap with a guide projection.
Figure 12:
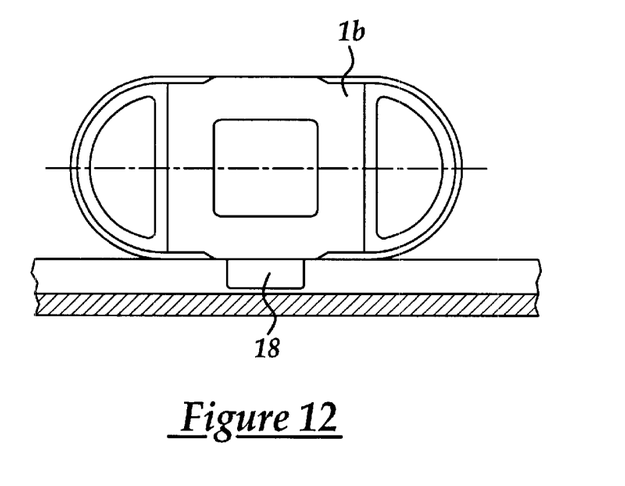
FIG. 12 side view of a chain strap with guide projection, illustrating the interaction between the guide projection and guide rail, FIG. 13 exploded view of a chain strap provided with a one-piece support bracket, and FIG. 14 exploded view of a chain strap provided with a support loop.

The design shown in FIGS. 11 and 12 can be used in place of guide channel 11 shown in FIGS. 4 to 9. A rail or track 16, laid in the shape of an arc and having a guide groove 17, can be provided which guide projections 18 on the lower narrow sides of chain straps 1a, 1b engage with play. This kind of track 16, preferably made of a thermoplastic material, can easily be bent into the desired shape by being pre-heated, if necessary. A groove can also be provided in guide channel 11 in order to accommodate guide projections 18.

Figure 13:
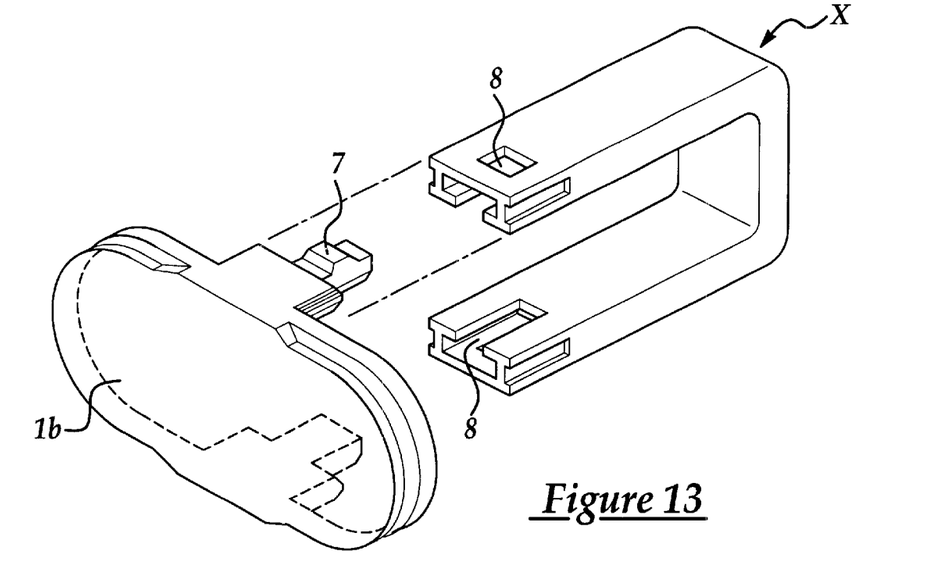
Figure 14:
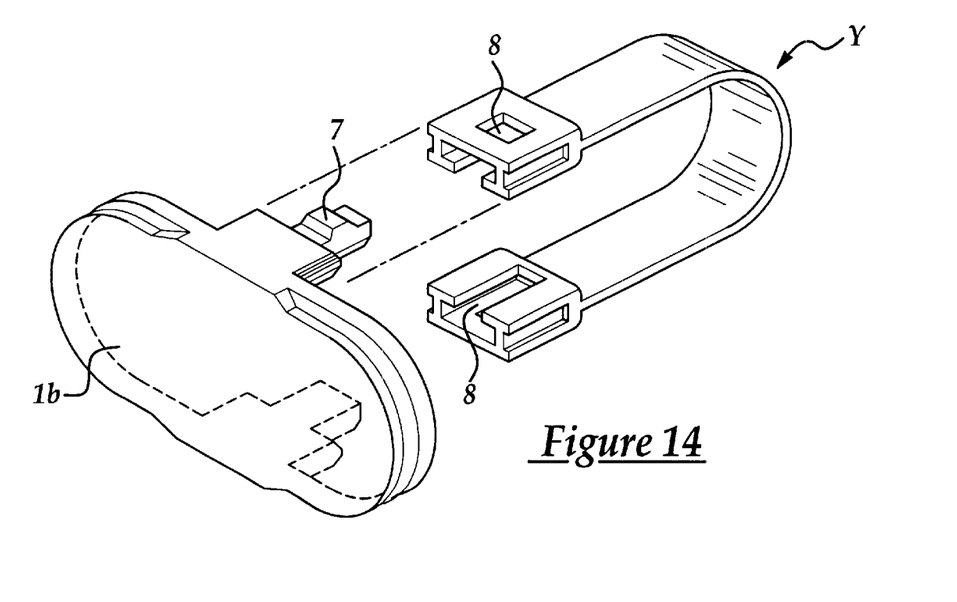

As shown in FIG. 13, in place of support frames 20a and 20b as shown in FIG. 1, a one-piece rigid U-shaped support bracket X can be used with recesses 8 which interact with the projections 7 for connection with the chain strap 1b. As shown in FIG. 14, a support loop Y is provided at its ends with recesses 8 and can be used with the chain straps instead of the support frames of FIG. 1.

What is claimed is:

1. An energy guiding chain for guiding cables and hoses from a fixed to a movable connection point on a curved path, said chain comprising a single strand of a plurality of elongated chain straps with first and second ends, each of said straps having first and second joint sections disposed at said first and second ends, respectively, with the first joint section of each strap overlapping the second joint section of the adjacent strap, the overlapping joint sections being connected together by a pivotal joint having a joint axis, the pivotal joints in the first and second joint sections of at least some of the chain straps having non-parallel, intersecting joint axes whereby adjacent are disposed at an angle relative to one another, and at least one support frame for accommodating the cables and hoses, said support frame being mounted on one of the straps.

2. An energy guiding chain as defined by claim 1 wherein the support frame comprises detachable upper and lower cross-members attached to the chain straps, and a detachable connecting member extending between the cross-members.

3. An energy guiding chain as defined by claim 7 including straps with parallel joint axes and wherein the straps with intersecting joint axes are alternately connected with the straps with parallel joint axes.

4. An energy guiding chain as defined by claim 2 wherein the pivotal joint of each of the overlapping joint sections comprises a hole in one joint section and a protruding pin on the other joint section which snaps into the hole.

5. An energy guiding chain as defined by claim 2 wherein said support frame mounted on one of said straps has a portion which overlaps the joint section of each adjacent strap whereby said portion acts as a stop to prevent separation of the adjacent straps by movement transversely of the chain.

6. An energy guiding chain as defined by claim 2 wherein one joint section of each of said overlapping joint section having a shoulder on its outer edge, and the other joint section of each of said overlapping joint sections having locking projections engaging a part of said shoulder to prevent separation of said adjacent strap.

7. An energy guiding chain as defined by claim 2 wherein at least some of the straps include guide projections for interacting with a guide groove in a stationary guide rail.

8. An energy guiding chain as defined by claim 1 wherein the support frame comprises a single-piece U-shaped bracket detachably mounted on one of the chain straps.

9. An energy guiding chain as defined by claim 8 including straps with parallel joint axes and wherein the straps with intersecting joint axes are alternately connected with the straps with parallel joint axes.

10. An energy guiding chain as defined by claim 8 wherein the pivotal joint of each of the overlapping joint sections comprises a hole in one joint section and a protruding pin on the other joint section which snaps into the hole.

11. An energy guiding chain as defined by claim 8 wherein said support frame mounted on one of said straps has a portion which overlaps the joint section of each adjacent strap whereby said portion acts as a stop to prevent separation of the adjacent straps by movement transversely of the chain.

12. An energy guiding chain as defined by claim 8 wherein one joint section of each of said overlapping joint section having a shoulder on its outer edge, and the other joint section of each of said overlapping joint sections having locking projections engaging a part of said shoulder to prevent separation of said adjacent strap.

13. An energy guiding chain as defined by claim 8 wherein at least some of the straps include guide projections for interacting with a guide groove in a stationary guide rail.

14. An energy guiding chain as defined by claim 1 including straps with parallel joint axes and wherein the straps with intersecting joint axes are alternately connected with the straps with parallel joint axes.

15. An energy guiding chain as defined by claim 14 wherein the pivotal joint of each of the overlapping joint sections comprises a hole in one joint section and a protruding pin on the other joint section which snaps into the hole.

16. An energy guiding chain as defined by claim 14 wherein said support frame mounted on one of said straps has a portion which overlaps the joint section of each adjacent strap whereby said portion acts as a stop to prevent separation of the adjacent straps by movement transversely of the chain.

17. An energy guiding chain as defined by claim 14 wherein one joint section of each of said overlapping joint section having a shoulder on its outer edge, and the other joint section of each of said overlapping joint sections having locking projections engaging a part of said shoulder to prevent separation of said adjacent strap.

18. An energy guiding chain as defined by claim 14 wherein at least some of the straps include guide projections for interacting with a guide groove in a stationary guide rail.

19. An energy guiding chain as defined by claim 1 wherein the pivotal joint of each of the overlapping joint sections comprises a hole in one joint section and a protruding pin on the other joint section which snaps into the hole.

20. An energy guiding chain as defined by claim 19 wherein said support frame mounted on one of said straps has a portion which overlaps the joint section of each adjacent strap whereby said portion acts as a stop to prevent separation of the adjacent straps by movement transversely of the chain.

21. An energy guiding chain as defined by claim 19 wherein one joint section of each of said overlapping joint section having a shoulder on its outer edge, and the other joint section of each of said overlapping joint sections having locking projections engaging a part of said shoulder to prevent separation of said adjacent strap.

22. An energy guiding chain as defined by claim 19 wherein at least some of the straps include guide projections for interacting with a guide groove in a stationary guide rail.

23. An energy guiding chain as defined by claim 1 wherein said support frame mounted on one of said straps has a portion which overlaps the joint section of each adjacent strap whereby said portion acts as a stop to prevent separation of the adjacent straps by movement transversely of the chain.

24. An energy guiding chain as defined by claim 23 wherein one joint section of each of said overlapping joint section having a shoulder on its outer edge, and the other joint section of each of said overlapping joint sections having locking projections engaging a part of said shoulder to prevent separation of said adjacent strap.

25. An energy guiding chain as defined by claim 23 wherein at least some of the straps include guide projections for interacting with a guide groove in a stationary guide rail.

26. An energy guiding chain as defined by claim 1 wherein one joint section of each of said overlapping joint section having a shoulder on its outer edge, and the other joint section of each of said overlapping joint sections having locking projections engaging a part of said shoulder to prevent separation of said adjacent strap.

27. An energy guiding chain as defined by claim 26 wherein at least some of the straps include guide projections for interacting with a guide groove in a stationary guide rail.

28. An energy guiding chain as defined by claim 1 wherein the support frame comprises a support loop for accommodating the cables and hoses.

29. An energy guiding chain as defined by claim 28 including straps with parallel joint axes and wherein the straps with intersecting joint axes are alternately connected with the straps with parallel joint axes.

30. An energy guiding chain as defined by claim 28 wherein the pivotal joint of each of the overlapping joint sections comprises a hole in one joint section and a protruding pin on the other joint section which snaps into the hole.

31. An energy guiding chain as defined by claim 8 wherein said support frame mounted on one of said straps has a portion which overlaps the joint section of each adjacent strap whereby said portion acts as a stop to prevent separation of the adjacent straps by movement transversely of the chain.

32. An energy guiding chain as defined by claim 28 wherein one joint section of each of said overlapping joint section having a shoulder on its outer edge, and the other joint section of each of said overlapping joint sections having locking projections engaging a part of said shoulder to prevent separation of said adjacent strap.

33. An energy guiding chain as defined by claim 28 wherein at least some of the straps include guide projections for interacting with a guide groove in a stationary guide rail.

34. An energy guiding chain as defined by claim 1 wherein at least some of the straps include guide projections for interacting with a guide groove in a stationary guide rail.

* * * * *

UNITED STATES PATENT AND TRADEMARK OFFICE
CERTIFICATE OF CORRECTION

PATENT NO. : 6,387,002 B1
DATED : May 14, 2002
INVENTOR(S) : Günter Blase

It is certified that error appears in the above-identified patent and that said Letters Patent is hereby corrected as shown below:

<u>Title page,</u>
Item [75], Inventors, delete "Gunter" and insert therein -- Blase --.
Item [73], the name of the Assignee should be -- Igus Spritzgußteile für die Industrie GmbH -- and not "Igus Spritzgubteile fur die..."

<u>Column 1,</u>
Line 28, delete "scraps" and insert therein -- straps --.

<u>Column 2,</u>
Line 10, delete "leas" and insert therein -- least --.
Line 41, delete "counted" and insert therein -- mounted --.
Line 46, delete "," and insert therein -- . --.
Line 53, delete "point" and insert therein -- joint --.
Line 64, delete "pains" and insert therein -- pins --.

<u>Column 3,</u>
Line 64, delete "D-D" and insert therein -- C-D --.

<u>Column 4,</u>
Line 40, delete "scraps" and insert therein -- straps --.
Line 58, delete "an laser" and insert therein -- and lower --.

<u>Column 5,</u>
Line 57, delete "rings" and insert therein -- ring --.
Line 57, delete "chapel" and insert therein -- channel --.

UNITED STATES PATENT AND TRADEMARK OFFICE
CERTIFICATE OF CORRECTION

PATENT NO.   : 6,387,002 B1
DATED        : May 14, 2002
INVENTOR(S)  : Günter Blase It is certified that error appears in the above-identified patent and that said Letters Patent is hereby corrected as shown below:

Column 6,
Line 42, delete "7" and insert therein -- 2 --.

Signed and Sealed this

Twentieth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,387,002 B1
DATED        : May 14, 2002
INVENTOR(S)  : Gunter Blase It is certified that error appears in the above-identified patent and that said Letters Patent is hereby corrected as shown below:

<u>Title page, Item [54] and Column 1, line 1,</u>
In the title, delete "FEED" and insert therein -- GUIDING --.

<u>Column 1,</u>
Lines 12-13, delete "for guiding".
Line 13, delete "a" and insert therein -- or --.
Line 17, delete "chain" and insert therein -- chains --.

Signed and Sealed this

Fifth Day of August, 2003

JAMES E. ROGAN
*Director of the United States Patent and Trademark Office*